(No Model.)

W. F. BROWNE.

PROCESS OF AND APPARATUS FOR EVAPORATING LIQUIDS.

No. 263,316. Patented Aug. 29, 1882.

Witnesses:—
R. Sylvani
E. H. Legrand

Inventor:—
Wm Frank Browne (No Model.) 15 Sheets—Sheet 2.

W. F. BROWNE.
PROCESS OF AND APPARATUS FOR EVAPORATING LIQUIDS.

No. 263,316. Patented Aug. 29, 1882.

Fig. 2.

Witnesses:—
R. Sylvain
E. H. Lepard

Inventor:—
Wm Frank Browne (No Model.)

W. F. BROWNE.
PROCESS OF AND APPARATUS FOR EVAPORATING LIQUIDS.

No. 263,316.  Patented Aug. 29, 1882.

Fig. 3.

Witnesses:

Inventor:
Wm Frank Browne (No Model.)

W. F. BROWNE.

PROCESS OF AND APPARATUS FOR EVAPORATING LIQUIDS.

No. 263,316. Patented Aug. 29, 1882.

Witnesses:—

Inventor.
Wm Frank Browne (No Model.) 15 Sheets—Sheet 10.

W. F. BROWNE.
PROCESS OF AND APPARATUS FOR EVAPORATING LIQUIDS.

No. 263,316. Patented Aug. 29, 1882.

WITNESSES.
INVENTOR.

(No Model.)
W. F. BROWNE.
PROCESS OF AND APPARATUS FOR EVAPORATING LIQUIDS.
No. 263,316. Patented Aug. 29, 1882.
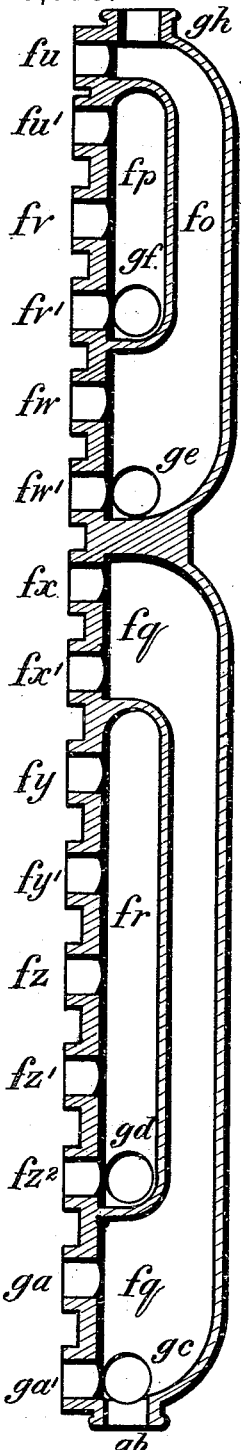
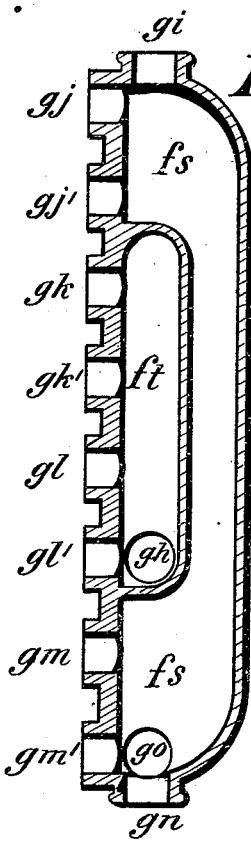
Fig. 13.
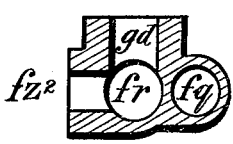
Fig. 14.
Fig. 15.
WITNESSES.
R. Sylvani.
E. H. Sprang
INVENTOR.
Wm Frank Browne

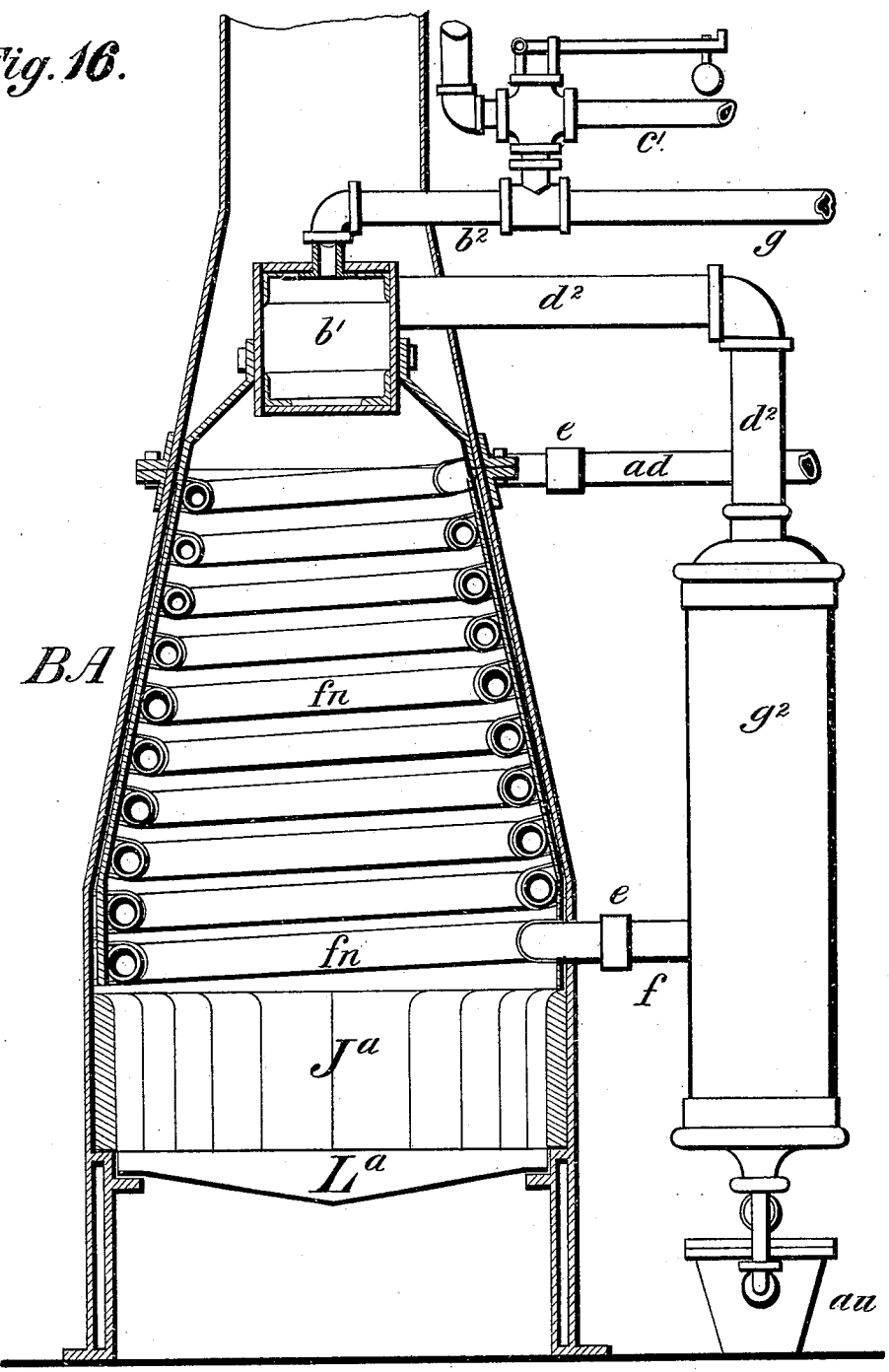

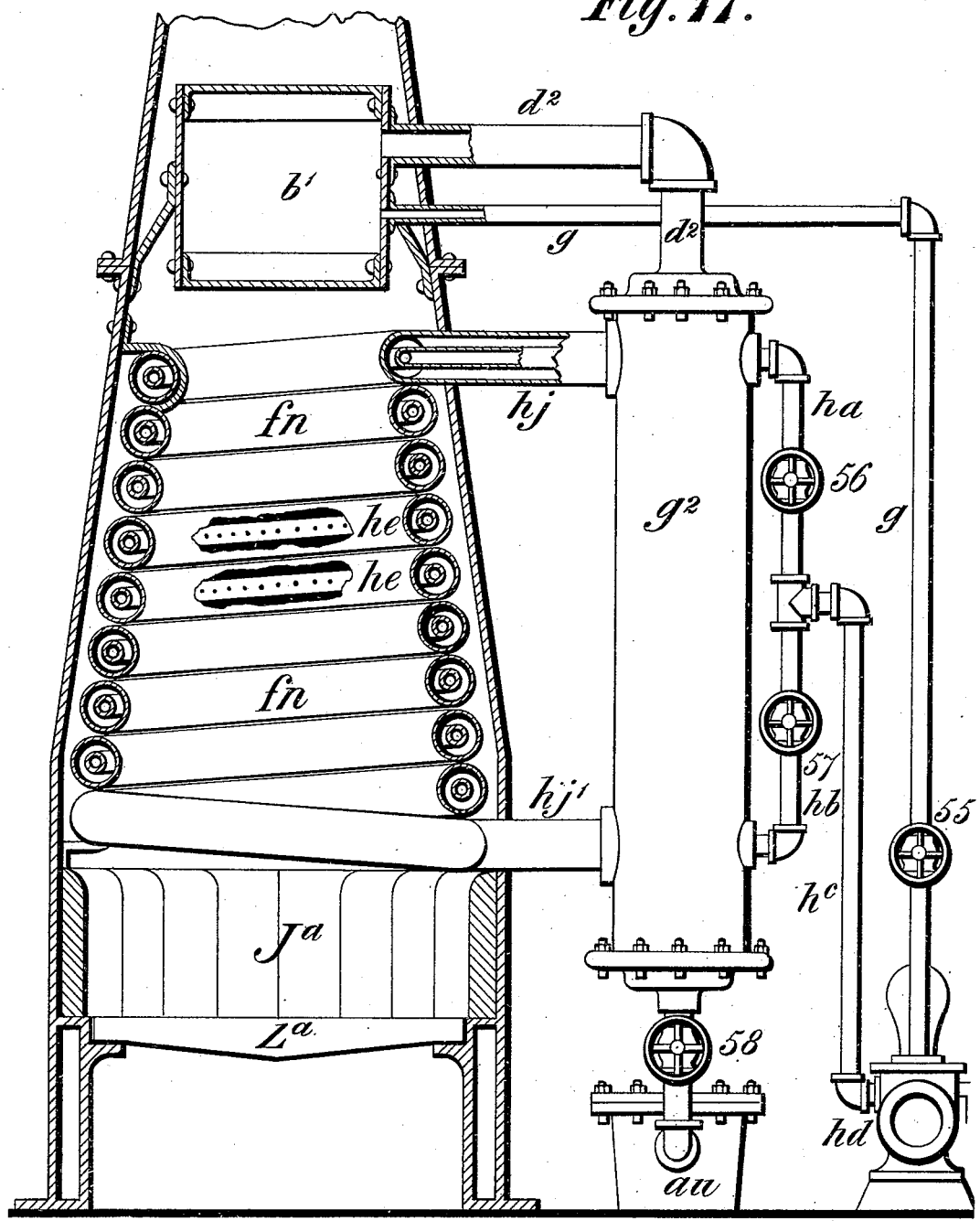

(No Model.) 15 Sheets—Sheet 14.
W. F. BROWNE.
PROCESS OF AND APPARATUS FOR EVAPORATING LIQUIDS.
No. 263,316. Patented Aug. 29, 1882.

WITNESSES
INVENTOR (No Model.) 15 Sheets—Sheet 15.
W. F. BROWNE.
PROCESS OF AND APPARATUS FOR EVAPORATING LIQUIDS.
No. 263,316. Patented Aug. 29, 1882.
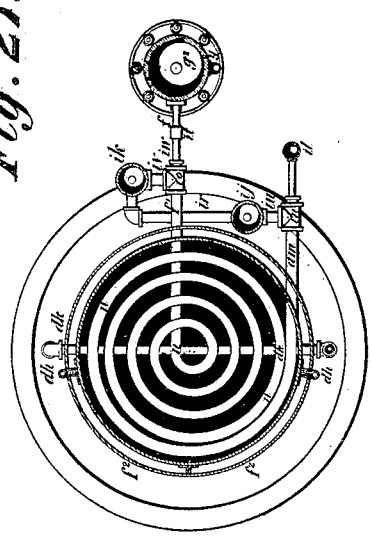
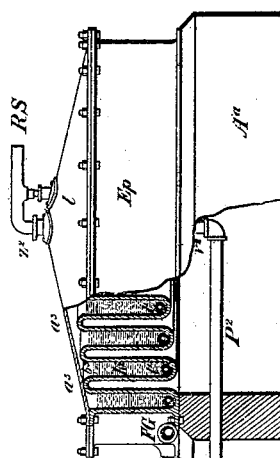
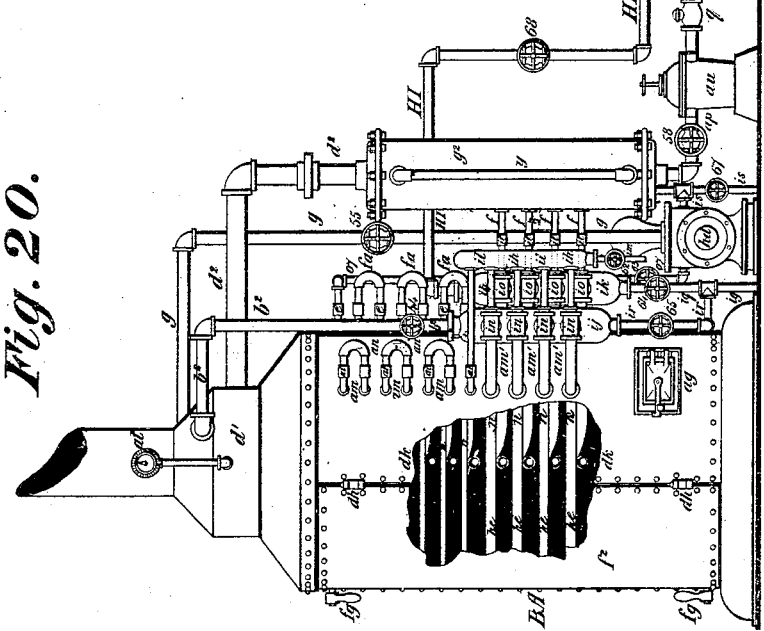
Witnesses:-
R. Sylvani
E. Legrand
Inventor:-
Wm Frank Browne

UNITED STATES PATENT OFFICE.

WILLIAM FRANK BROWNE, OF NEW YORK, N. Y.

PROCESS OF AND APPARATUS FOR EVAPORATING LIQUIDS.

SPECIFICATION forming part of Letters Patent No. 263,316, dated August 29, 1882.

Application filed December 19, 1881. (No model.)

*To all whom it may concern:*

Be it known that I, WM. FRANK BROWNE, of the city, county, and State of New York, have invented a new and useful Process of and Apparatus for Evaporating Liquids from any organic or inorganic matter which may be held in suspension or chemically combined therewith; and I do hereby declare that the following is a clear and full description thereof, reference being had to the accompanying drawings, which form a part of this specification.

This invention relates to an improved method or process of and means for recovering from liquids any organic or inorganic matter that is possessed of a greater specific gravity than the liquid in which it is contained.

Figure 1:
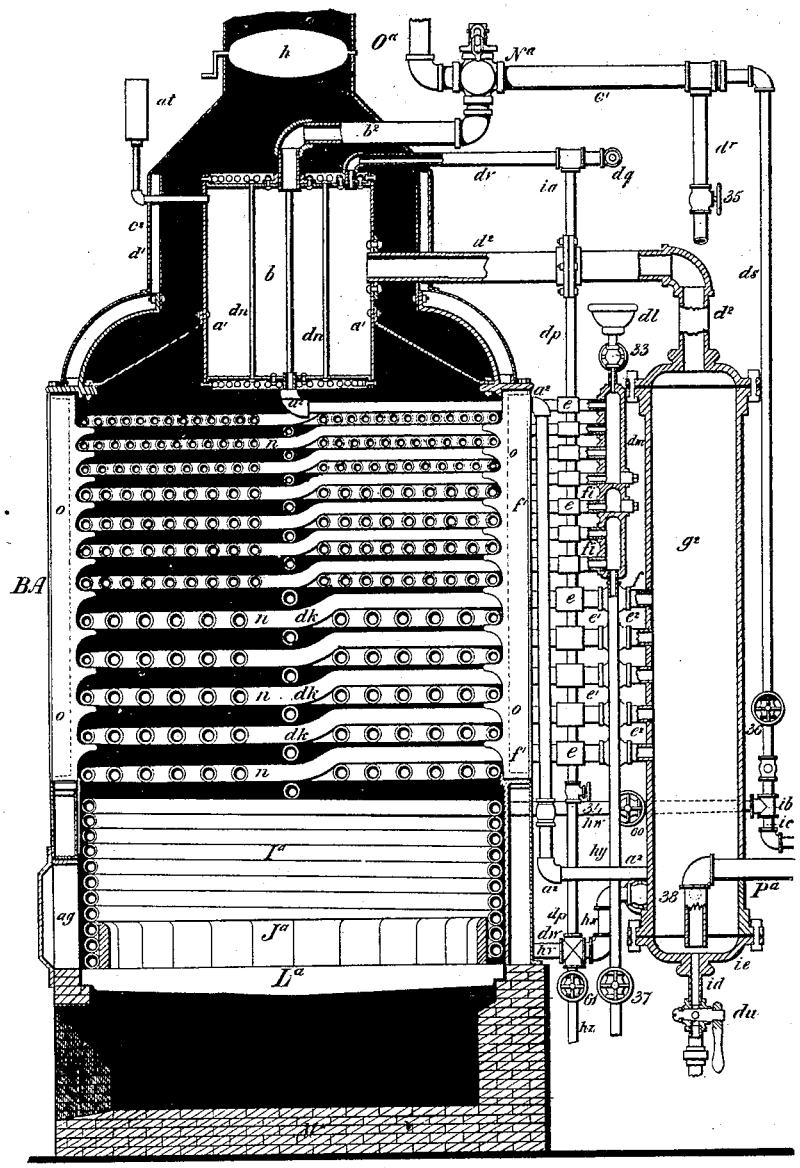
Figure 4:
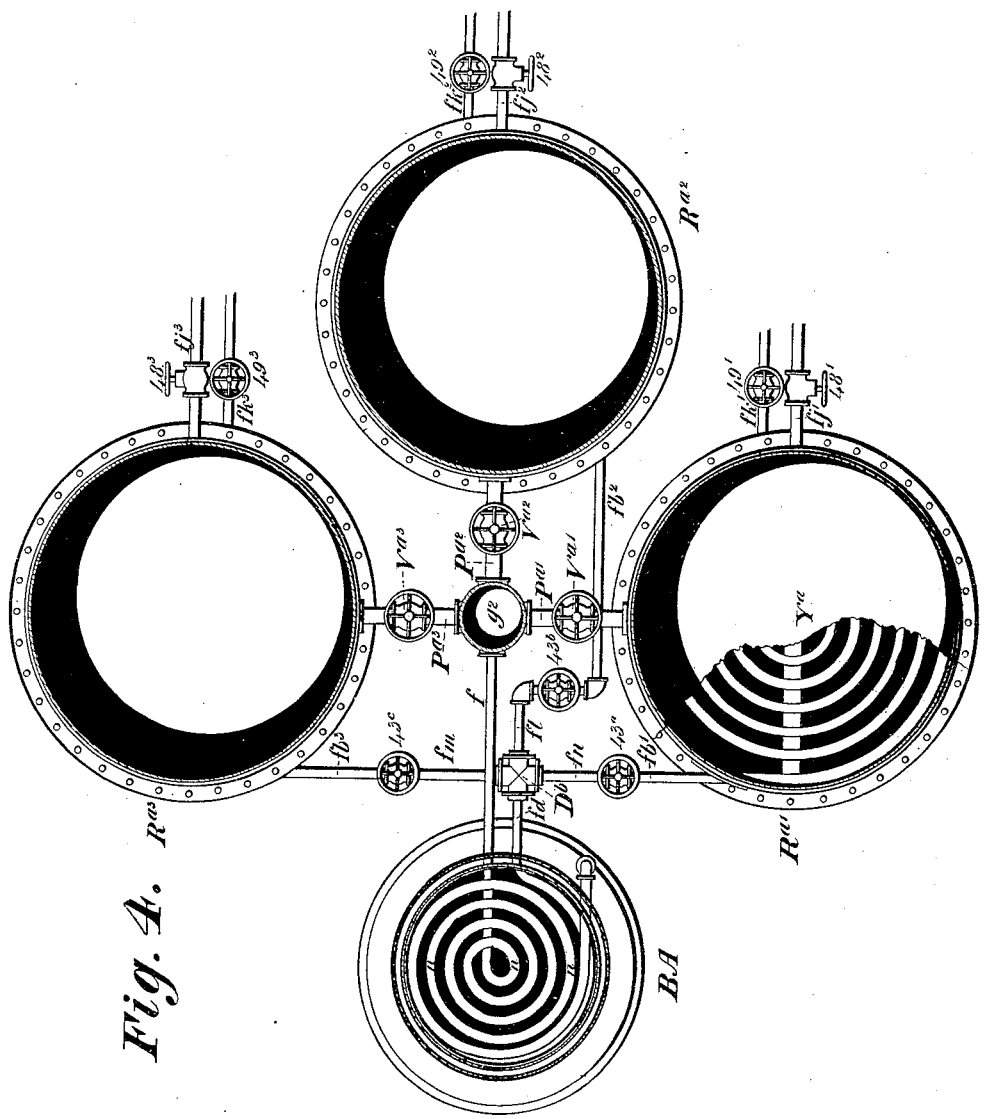
Figure 5:
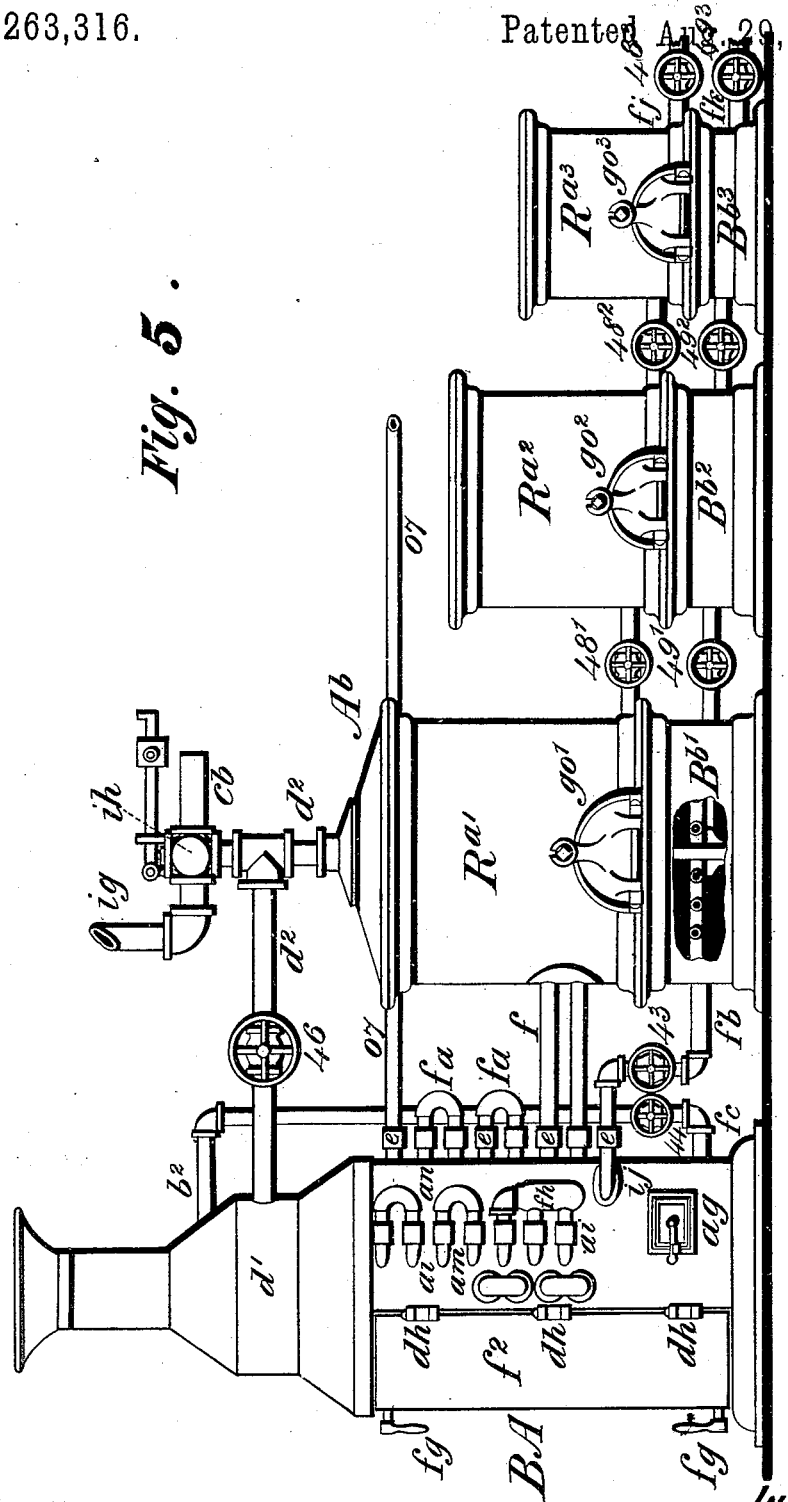
Figure 6:
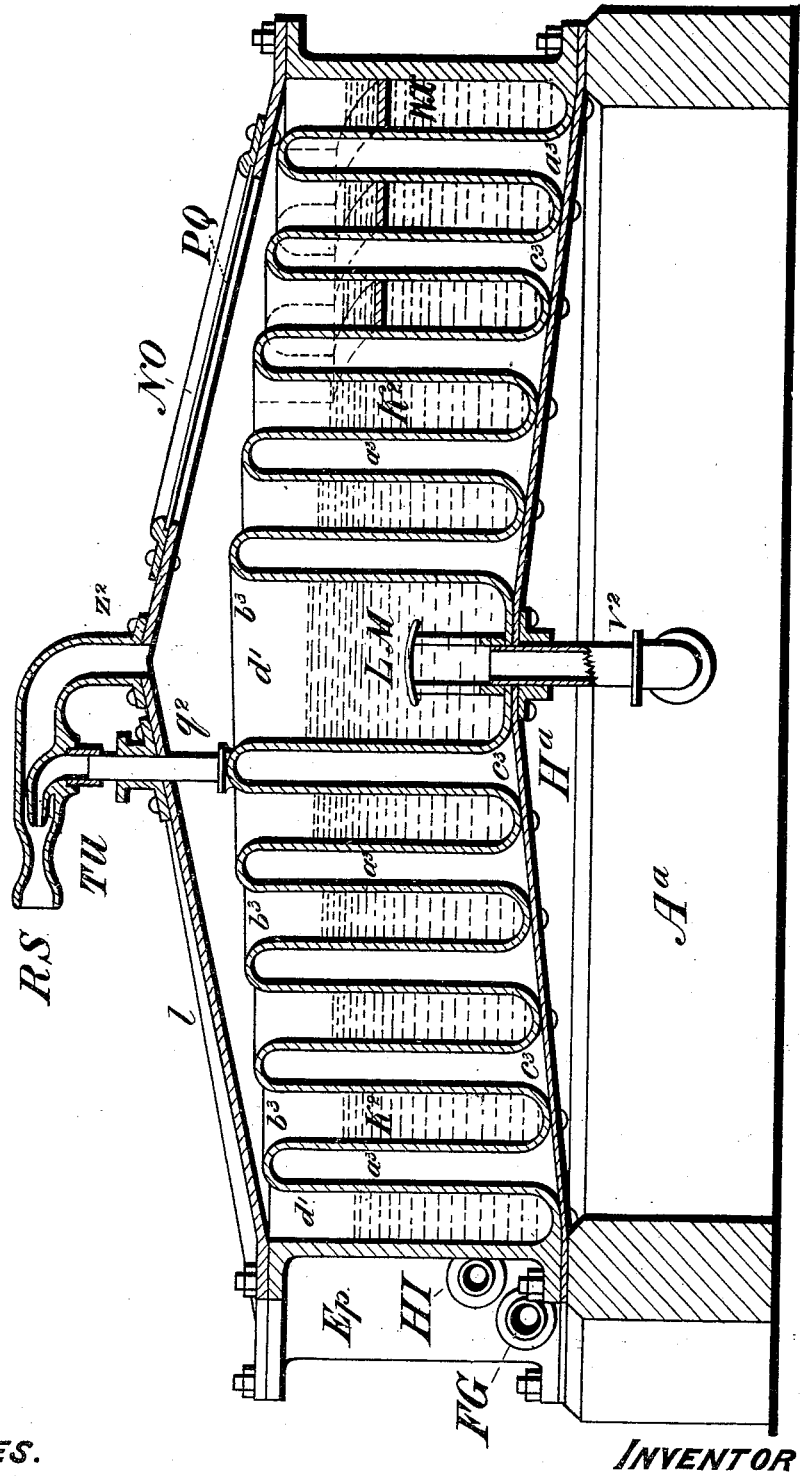
Figure 7:
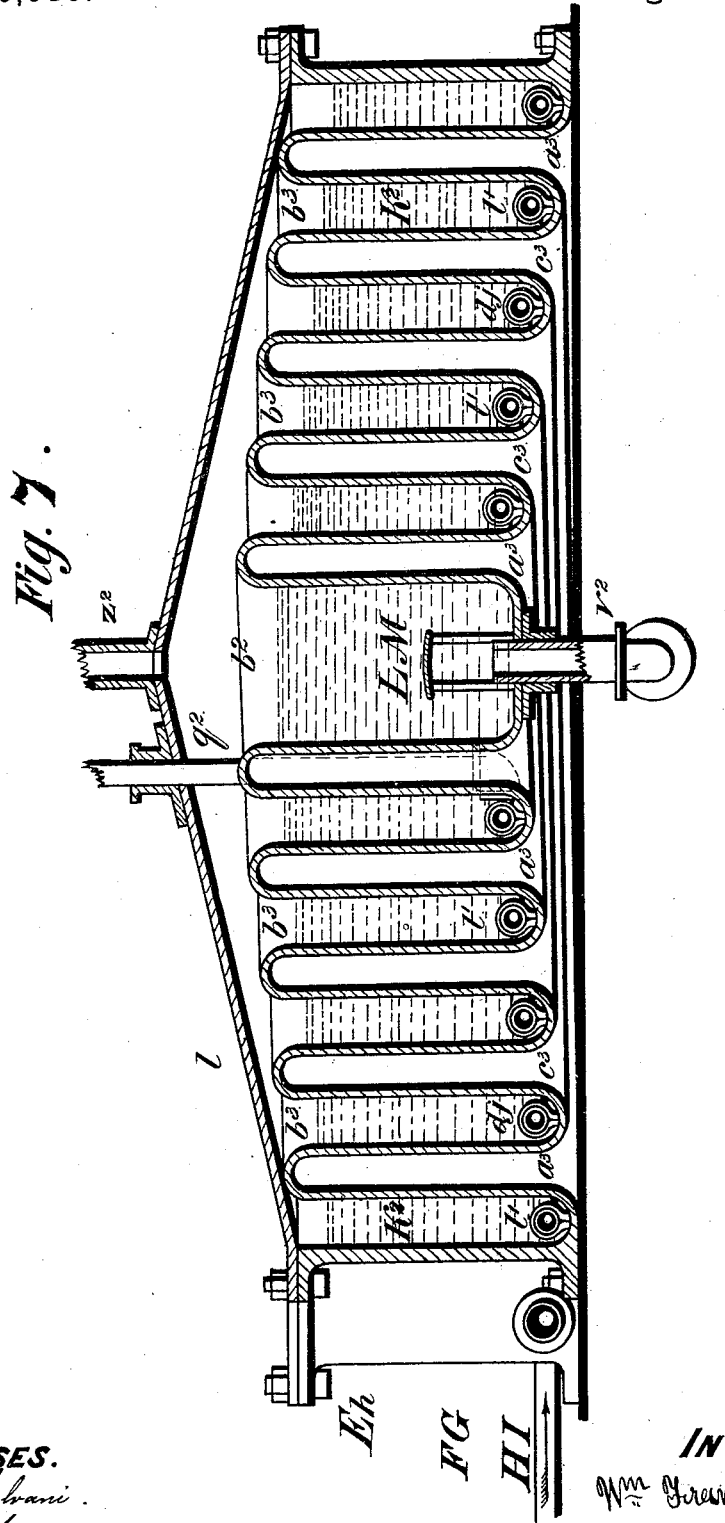
Figure 8:
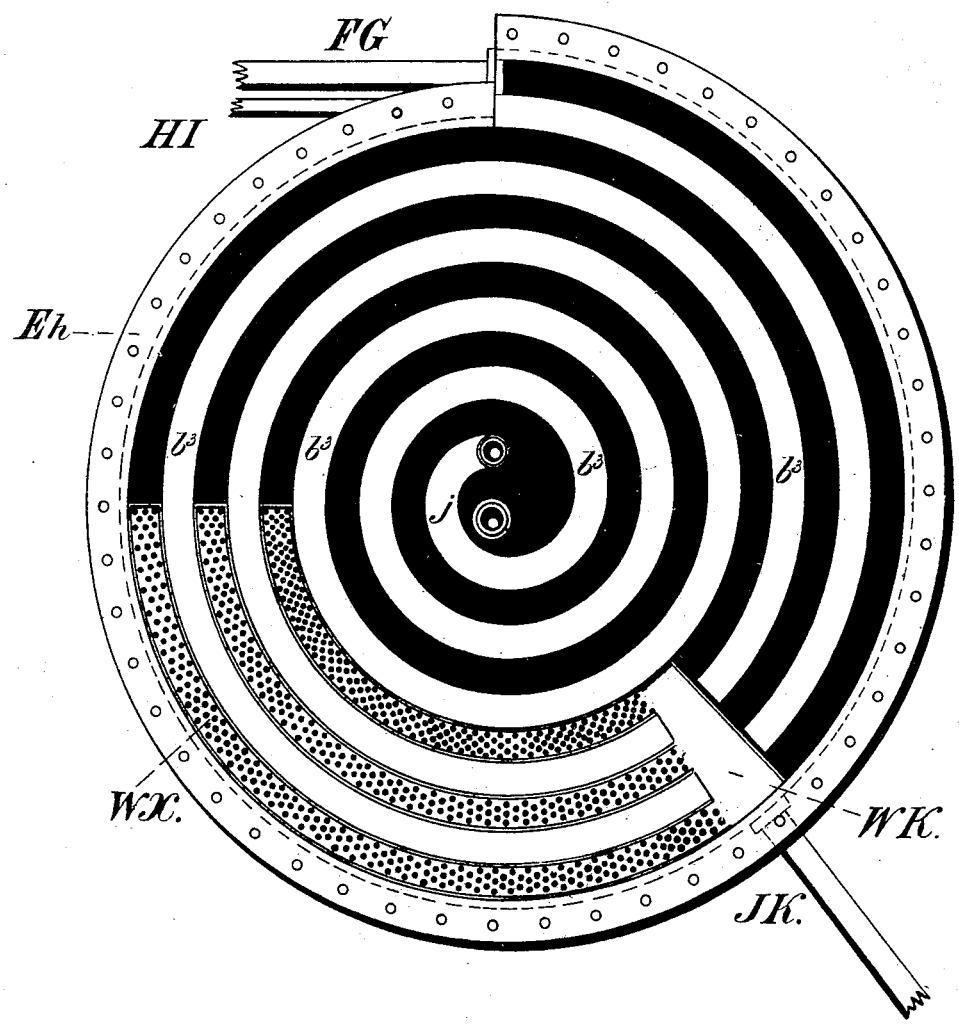
Figure 9:
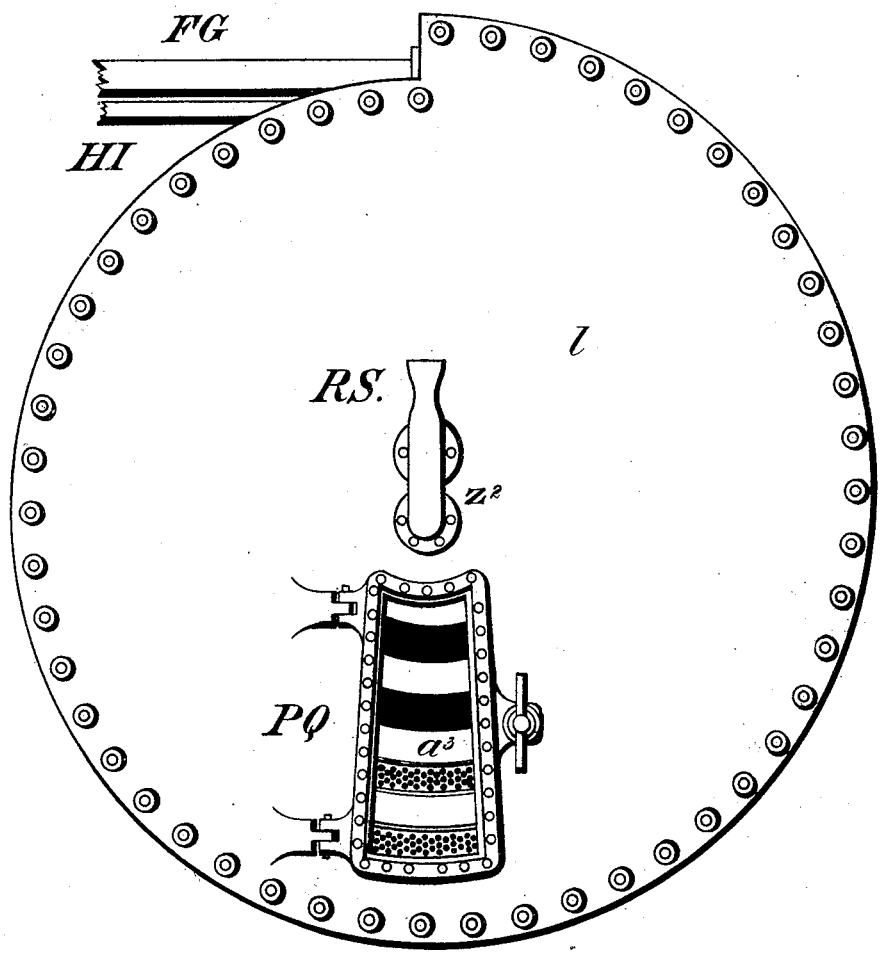
Figure 10:
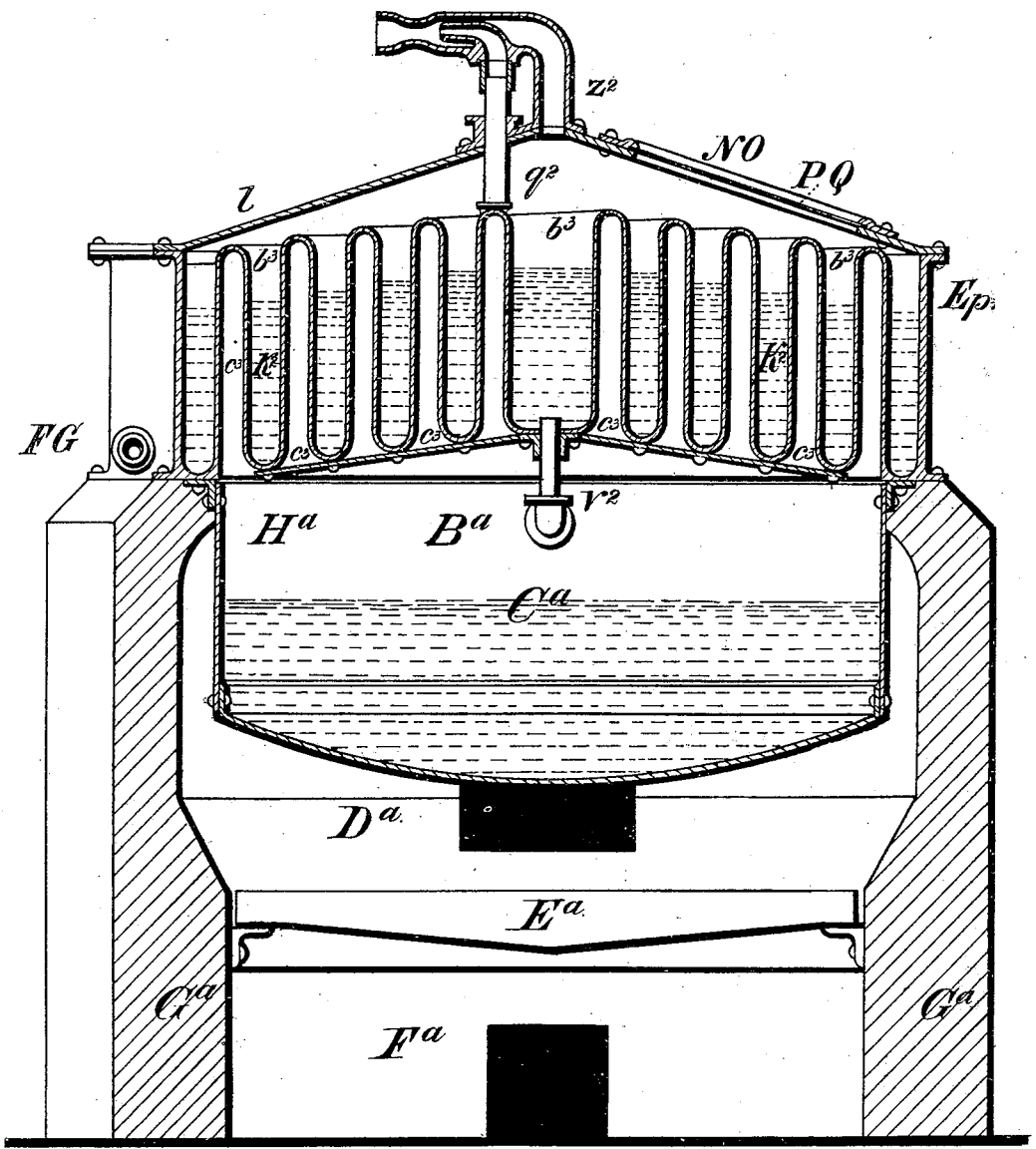
Figure 19:
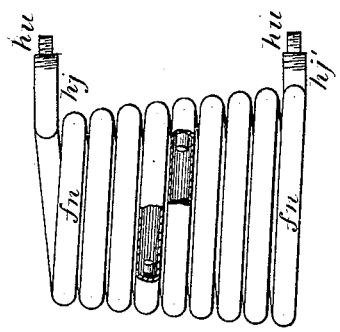
Figure 18:
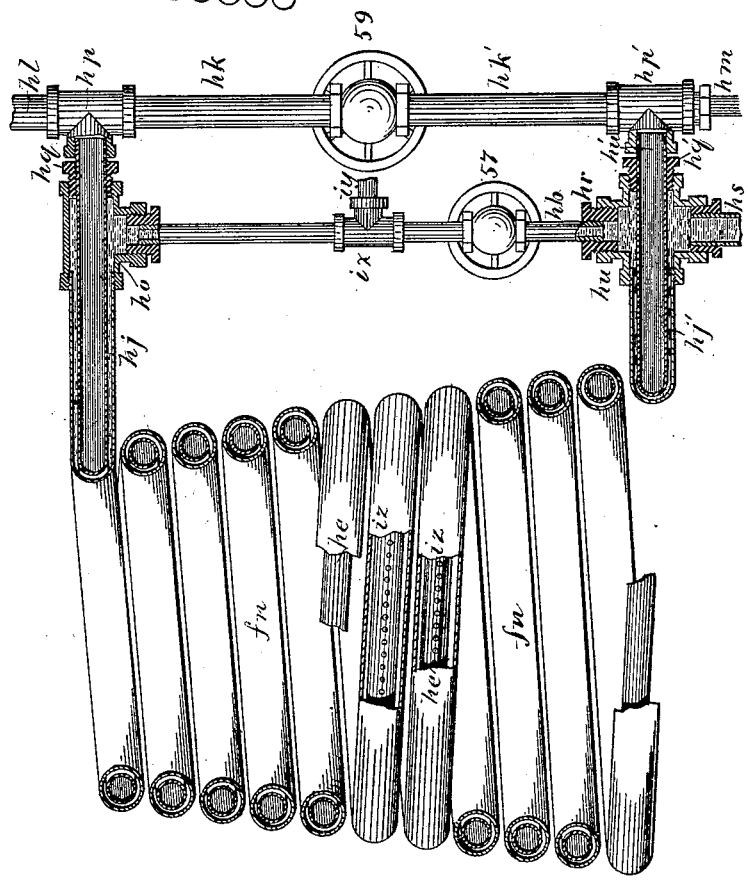

Figure 1 is a vertical central sectional view of a heating device for heating liquids containing organic or inorganic matter to be recovered in a desiccated, plastic, or other concentrated form analogous to sirups and glutinous substances which may or may not be desiccated. Fig. 2 is a central sectional view of a chamber, separator, or receiver into which the substance to be recovered is discharged from the heating device, and wherein the process of evaporating is continued by the application of auxiliary heat. Fig. 3 is a vertical sectional view, showing the heating device and a chamber into which the contents thereof are discharged for the purpose of eliminating the volatilized or evolved aqueous or liquid matter. Fig. 4 is a sectional plan view of the heating device and evaporating chamber or pans. Fig. 5 is an external view of the heating device and evaporating-chamber, showing the manner of connecting the discharge-pipes of the heating device with the evaporating-chamber. Fig. 6 is a vertical sectional view of a spiro-convoluted evaporating-pan. Fig. 7 is a vertical sectional view of a spiro-convoluted evaporating-pan, showing a steam heating-coil arranged in the convolutions, and over which the liquid to be evaporated passes. Fig. 8 is a plan view of the spiro-convoluted evaporating-pan with the cover removed. Fig. 9 is a plan view of the spiro-convoluted evaporating-pan with the cover in position. Fig. 10 is a vertical sectional view of the spiro-convoluted pan mounted on a furnace. Figs. 11, 12, 13, 14, and 15 are views representing the feed-water and circulating device which connects with the ends of the conduits in the heating device. Fig. 16 is a vertical sectional view of a heating device, showing a single coil or conduit. Fig. 17 is a vertical sectional view of a heating device, in which a helical coil is represented with an internal perforated coil therein. Fig. 18 is a coil in which an internal perforated pipe is shown, and through which the steam escapes from the generating-coil. Fig. 19 is a coil in which a portion of the internal pipe is represented as being cut away, thus exposing two ends through which the steam enters on its passage out of the center coil. Fig. 20 is a heating and evaporating device. Fig. 21 is an evaporating-pan. Fig. 22 is a horizontal section and plan of a heating and evaporating device.

Like letters of reference designate corresponding parts in all of the figures.

The vertical sectional view of the heating device B A, Fig. 1, is mounted upon a base, $M^a$, which base includes the ash-pit with door $K^a$ thereto. The superheating-coil $I^a$ and fire-brick $J^a$ rest upon the grate-bars $L^a$. The door $a\,g$ leads to the furnace. A series of coils or conduits, $n$, are located in the coil or combustion-chamber and rest upon the supporting-lug $o$ and a hollow water-bar, $d\,k$. The ends of these bars project through the shell and are connected by suitable fittings, which admits of a free circulation of liquids through the series. By means of these bars and a free circulation of liquids therein great heat can be applied to the coils or conduits without fear of sagging down at the center. The liquid should be forced into the bottom and circulate upward from thence through the upper coil or conduit, and thence downward through the series, and thence discharged into the separator $g^2$, where the volatile parts will expand and pass off through pipe $d^2$ into dome $b$, and from thence through pipes to places of use. The dome $b$ is provided with stay-bolts $d\,n$ and supporting-brackets $a'$, which rest upon the upper flange of the combustion-chamber, and are bolted thereto. The bonnet $d'$ is composed of two shells with a space, $c^2$, between them for the purpose of conducting the radiated heat from the inner shell to the uptake. Perforations can be made in the outer shell at the base of the bonnet for the admission of air, which will cause, in connection with the heat, a rapid circulation through the space. The pressure in the dome is ascertained by the steam-gage $a\,t$. The stack is provided with a damper, $h$. The dome is provided with a drain-pipe, $a^2$, which connects it with the separator $g^2$. The coils or conduits $n$ project tangentially from the outer and inner circles, and parallel, or nearly so. The inner ends, $f'$, are connected by suitable fittings, $e$, nipples $e'$, $fi$, valves $e^2$, and nipples $f$ to circulating feed-pipe $d\,m$ and separator $g^2$. The top of the circulating feed-pipe is provided with a funnel, $d\,l$, which is for the purpose of charging the heating device with liquids prior to the generation of steam. When sufficient pressure is obtained the steam can be used to pump the liquid into the coils. The controlling-valve 33 is to prevent the back-pressure from forcing the liquids out of the feed-pipe $d\,m$. This feed-pipe is provided with a drain-pipe, $h\,y$, with controlling-valve 37 thereon.

The lower end, $h\,v$, of the superheating-coil $\mathrm{I}^a$ terminates in the cross-fitting $d\,w$. The under side of the cross-fitting is provided with a blow-off pipe, $h\,z$, and controlling-valve 61 thereon. A pipe, $h\,x$, connects the cross-fitting $d\,w$ with the separator $g^2$. The circulation through said pipe $h\,x$ is controlled by valve 38. The pipe $d\,p$, with controlling-valve 34, T-fitting $i\,a$, and pipe $d\,v$, forms a connection between the dome and the superheating-coil $\mathrm{I}^a$. The outlet of the superheater is through pipe $h\,w$, which is provided with controlling-valve 60. The end of this pipe connects to a T-fitting, $i\,b$, to the run of which the pipes $d\,s$, with controlling-valve 36 and pipe $i\,c$, are connected, while their other ends are connected respectively with the pipe $c'$, which leads from the safety device $\mathrm{N}^a$ and the evaporating-chamber $\mathrm{R}^a$. (Shown in Fig. 2.) The discharge-pipe $\mathrm{P}^a$ and controlling-valve $\mathrm{V}^a$ thereon connect the separator $g^2$ with evaporating-chamber $\mathrm{R}^a$. The pipe $\mathrm{P}^a$ projects into the separator, and thence downward to near the bottom thereof. The cap $i\,e$ is provided with a blow-off pipe, $i\,d$, and plug cock or valve $d\,u$ thereto.

The evaporating-chamber $\mathrm{R}^a$ is mounted upon a foundation containing the furnace $\mathrm{Q}^a$. This chamber is provided with an outer jacket, $i\,f$, which forms a steam and water space, $\mathrm{U}^a$ and $\mathrm{T}^a$. Stay-bolts $d\,x$ are to keep the jacket from bursting when under pressure. The blow-off pipe $d\,g$, with controlling-valve 39, is for the purpose of regulating the steam generated within the boiler or space $\mathrm{T}^a$, or the steam derived from other sources. The blow-off pipe $f\,a$ and controlling-valve 41 are for the purpose of draining the water-space $\mathrm{T}^a$, while the pipe $d\,z$, with valve 40, is for draining liquid from the evaporating-chamber. The stack $\mathrm{W}^a$ is for conducting the products of combustion from the furnace.

In Fig. 3 the heating device B A is shown in connection with an evaporating-chamber, $\mathrm{R}^a$, which is shown in section. The substance to be evaporated from the matter to be recovered is forced into the heating device through feed-pipe $o$, and circulates downward through the conduits $f'$ and $a\,m$. These conduits are connected by fittings $f\,a$ and $d\,z$. The right-and-left couplings $e$ and $a\,i$ and nipples $f\,i$ and $a\,n$ connect said fittings $f\,a$ and $d\,z$ to the conduits, and in such manner that a free circulation is obtained throughout the series. Hollow supporting-bars $d\,k$ (shown in sectional view, Fig. 1) are employed, and connected by return-bands $f\,h$. The feed water or liquid is at first forced through the supporting-bars, and thence to the upper coils or conduits. The case or shell is provided with two doors, $f^2$, which embrace nearly one-half of the shell and swing upon the hinges $d\,h$, and when closed are held in place by suitable devices, $f\,g$.

The drain-pipe $a^2$ is for conducting the condensation from the dome, which is covered by the bonnet $d'$, to a trap, or with device which will discharge the condensed matter to any place required. The discharge end of the two lower coils, $f$, project into the evaporating-chamber $\mathrm{R}^a$. This chamber is provided with a cover, $\mathrm{A}^b$, which fits tightly to the evaporating-chamber by means of flanges and bolts. A pipe, $d^2$, is secured to the top of the cover. A T-fitting is screwed to the top end of the pipe and to the outlet thereof. A continuation of the pipe $d^2$ extends to the steam-dome. The valve 46 thereon is to control the action of the current of steam or vapor therein.

In the chamber $\mathrm{X}^a$ a heating-coil, $y\,a$, is located. By means of this coil and the steam which flows through heat is imparted to and transmitted through the bottom of the chamber $\mathrm{R}^a$ for the purpose of drying or desiccating the organic or inorganic substance when necessary, and when not necessary steam should not pass through the heating-coil. A standard or support, $\mathrm{Z}^a$, is placed beneath the bottom of the chamber $\mathrm{R}^a$ to assist in holding the bottom when great weight has accumulated thereon.

The pipe $f\,j$, with valve 48, is for draining the chamber when required. The pressure in the heating-coil $y\,a$ is in part regulated by valve 49 and blow-off pipe $f\,k$. The steam for this heating coil can be derived from a boiler located at any convenient distance therefrom; but the arrangement shown in the drawings is practicable, and also it is a very important factor in the aforementioned invention. By the means shown the steam or vapor which is eliminated from the solid or dense matter in the evaporating-chamber $\mathrm{R}^a$ is conducted by pipe $d^2$ to a dome, thence from the dome into and through pipe $d\,p$ to the lower end, $f\,e$, of the superheating-coil $\mathrm{I}^a$, (shown in Fig. 1,) thence through said superheating-coil, whence it is discharged through the upper end, $f\,d$, into and through pipe $f\,b$, thence into the heating-coil $y\,a$, and out at the blow-off pipe $f\,k$. Steam for the pump is conducted by pipe $d\,g$ and controlled by valve 47. The exhaust from the pump can be conducted by pipe $fc$ into and through the supporting-coil, and thence through pipe $fb$ into and through the heating-coil $ya$. Whenever an engine is run by the steam eliminated in the chamber $R^a$ and the demand equals the supply the exhaust can be forced through the superheating-coil, and thence through the heating-coil. A train of evaporating-pans similar to those shown in Figs. 6, 7, 8, 9, and 10 can be attached to or connected with the separating-chamber $R^a$.

The separating-chamber $R^a$ can be made in any suitable form and dimension, with or without a cover or heating-space beneath the bottom thereof. The wall of the chamber can be provided with suitable door or doors, through which the accumulations can be removed when in a desiccated state; but when in the condition of a sirup it can be drawn off through drain-pipe $fj$.

Fig. 4 is the representation of a horizontal sectional plan view of the heating device B A, evaporating-chambers $R^{a\prime}$, $R^{a2}$, and $R^{a3}$, and separator $g^2$. The evaporating-chambers are connected to the separator by pipes $P^{a\prime}$, $P^{a2}$, and $P^{a3}$, which are provided with controlling-valves $V^{a\prime}$, $V^{a2}$, and $V^{a3}$. The coil $n$ in the heating device connects with the separator $g^2$. The discharge end of the superheating-coil connects with the cross $D^b$, from whence superheated steam is conducted through pipe $fn$ and discharged into the end $fb'$ of the coil $ya$, from whence it is discharged through the outlet $fk'$, the pressure in the coil being controlled in part by valve $49'$. Valve $43^a$ is to control the induction of steam into the heating-coil. The pipe $fl$ conducts the steam from the cross and discharges it into the end $fb^2$ of the heating-coil in the chamber beneath the bottom of the evaporation pan or chamber $R^{a2}$. The discharge therefrom is through $fk'$, and is controlled by valve $49'$. The pipe $fm$ conducts steam from the cross and discharges it into the end $fb^3$ of the heating-coil beneath the bottom of the evaporating-chamber $R^{a3}$. The discharge therefrom is through pipe $fk^3$ and controlled by valve $49^3$. The drain-pipes $fj'$, $fj^2$, and $fj^3$ and controlling-valves $48'$, $48^2$, and $48^3$ are for draining the chambers $R^{a\prime}$, $R^{a2}$, and $R^{a3}$ when necessary. These evaporating-pans can be open or closed vacuum-pans, which can be provided with vacuum pump or pumps or the device shown in Fig. 6. These pans are designed for evaporating the volatile part of any liquid or fluids containing organic or inorganic matter. In place of the heating-coils $ya$, the pan can be located over a furnace, as shown in Fig. 2, from whence heat will be derived to complete the evaporation. The substance to be evaporated and recovered is forced through the heating device B A, and thence discharged into the separator $g^2$, where the volatile part or steam is partially eliminated from the solid or the part to be recovered, which is now discharged by suitable trapping device into the evaporating-chamber $R^{a\prime}$, which operation continues until the necessary amount of the matter to be recovered has deposited or accumulated in the pan, after which the valve $V^{a\prime}$ is closed and valve $V^{a2}$ opened, thus allowing the products in the separator to be discharged into pan $R^{a2}$. On opening valve $43^b$ steam will flow into the heating-coil, while the valve $43^a$ is left open for the purpose of continuing the heat and evaporation in pan $R^{a\prime}$ to the point desired, after which the valve should be closed. When the desired amount of deposition or accumulation has been obtained in pan $R^{a2}$ the valve $V^{a2}$ should be closed and valve $V^{a3}$ opened, thus discharging the unvolatilized matter and substance to be recovered into pan $R^{a3}$. On opening valve $43^c$ steam will flow into the heating-coil beneath the bottom of the evaporating-chamber. The flow of steam is continued in and through the heating-coil beneath the bottom of pan $R^{a2}$ until the matter to be recovered is reduced to a proper condition or consistency, after which valve $43^b$ should be closed. In the meantime, during the progress of the operation thus far, the evaporating-pan $R^{a\prime}$ can be cleaned and made ready for subsequent use by the time pan $R^{a3}$ has received a sufficient amount of deposit.

An external elevation of an evaporating apparatus is shown in Fig. 5, the heating device being the same as shown in Figs. 1 and 3. The discharge from the heating device is through pipes $f$ into a separating-chamber, $R^{a\prime}$, where the steam is eliminated, and conducted by pipe $d^2$ and discharged therefrom into the dome; or by closing valve 46 the steam can be discharged from pipe $cb$, and, also, if too much steam or vapor is generated, the safety-valve $ih$ will rise and allow said steam to escape through pipe $ig$. The steam from the dome is conducted by pipe $b^2$ and discharged into the lower end, $fc$, of the superheating-coil, and is discharged therefrom through pipe $ij$ into the end $fb$ of the heating-coil, located in a chamber, $B^{b\prime}$, beneath the bottom of the evaporating-pan. The steam is controlled by valves 43 and 44, and the exit of the steam from said heating-coil is controlled by valve $49'$. The steam can now be conducted into and through a heating-coil in pan $R^{a2}$, from thence into and through pan $R^{a3}$, and finally discharged through pipe $fk$ and valve $49^3$. The pans $R^{a2}$ and $R^{a3}$ are without covers, but can be provided with them when required, and also with a device for producing a vacuum. The doors $go'$, $go^2$, and $go^3$ are for the purpose of opening and withdrawing the matter accumulated within the pan when in a desiccated condition; but when in the condition of a sirup, or in a condition analogous thereto, the matter can be drawn off through valve $48^3$.

In Fig. 6 a spiro-convoluted vacuum evaporating-pan, $E^p$, is represented in vertical central section, mounted on the base $A^a$. The pan is made of cast metal, with a top flange, on which the cover $l$ is fitted steam-tight and held in place by suitable bolts. An ejector, $z^2$, is fitted and secured to the cover and communicates with the interior of the pan. The nozzle T U connects with the steam-discharge pipe $q^2$, which is secured to one of the convolutions of the pan, from whence steam is derived to form the jet. The under sides of the convolutions are covered with the plate $H^a$, which is fitted steam-tight, or nearly so, whereby a spiral chamber or channel is formed, which occupies one-half, or nearly so, of the interior of the pan. The steam is admitted at H I and circulates through the channel, and thence discharged therefrom through pipe $q^2$ and ejector $z^2$. The steam for heating the pan may be derived from any suitable steam-generating apparatus; or hot gases can be employed for the same purpose; and, also, when liquids which are easily volatilized are to be evaporated, hot water can be run through the channel $a^3$ and discharged from pipe $q^2$, with or without being in connection with the ejector; or the water can be introduced into the spiral channel through pipe $q^2$, from whence it will flow down the inclined channel and be discharged at H I. The substance to be evaporated and recovered is conducted through pipe $V^2$ into the pan. The force of the upward flow, when under pressure, is broken by the device L M, and thence flows down the channel $k^2$ and discharges at F G. The line $d'$ represents the height of the flowing liquid. An automatic skimmer is shown at W X. N O and P Q represent a window through which the interior can be observed.

In the sectional view, Fig. 7, a steam heating-coil, $l'$, is provided, and shown located in the channel through which the substance to be recovered and evaporated flows. The induction to this coil is at H I, while its discharge is through pipe $q^2$ into the open air, or into and through an ejector shown in Figs. 6 and 10. The device $d\ j$ is for keeping the coil from resting on the bottom of the channel. This coil and pan can be connected with any steam-generating apparatus from which a supply of steam can be obtained, and also it can be placed over a suitable furnace or other heating device from whence heat can be derived.

A plan view of the pan $E^p$ is shown in Fig. 8, in which the upward spiral projecting channel $b^3$ is shown, while the black spiral division represents the downward-projecting channel through which the substance to be evaporated flows. In the top plan view, Fig. 9, the interior of the pan is shown, and the action of the evaporating substance can be observed at all times. One or more of these windows can be used for observation, and one of which should be immediately over the point where the scum from saccharine juices or sirups collects. The window is also provided with suitable hinges and fastening devices, whereby it can be opened and the scum or other obstruction cleared away, if the outlet or passage should become clogged. The spiral channel can be cleaned by connecting the discharge-pipe F G with a steam-supply pipe and forcing steam or superheated steam through said channel, the discharge of which would be through the ejector $z^2$; or when a heating-coil is employed, as shown in Fig. 7, the steam from said coil can be made to enter the pan by putting a valve on the end of the ejector R S, which will cause the steam to flow back through the channel and be discharged at H I.

In vertical central view, Fig. 10, the spiro-convoluted vacuum-pan $E^p$ is represented with a steam-generator, $C^a$, attached to the bottom thereof. This generator can be made tubular or in any suitable manner. The generator is arranged in a suitable furnace, $G^a$, provided with a feed-door, $D^a$, grate-bar, $E^a$, and ash-pit, $F^a$. The bottom of the pan $E^p$ is covered by a plate, $B^a$, the outer edge of which can be perforated or made of less diameter than the pan, and through which the steam from the generator enters the outer internal channel, $c^3$, and circulates to the center, from whence it makes its escape through the ejector $z^2$ or any other suitable device.

The discharge-pipe $q^2$ can be provided with a safety-valve, whereby a given amount of pressure can be obtained in the generator and spiral channel, which pressure can be regulated to suit the requirements of the substances to be evaporated.

When cane-juice is to be evaporated it may be possible to obtain steam and suitable pressure therefrom to drive the rollers to crush the cane with, and also it will be practicable to furnish motive power when many substances are to be evaporated.

The sectional views shown in Figs. 11, 12, 13, 14, and 15 represent a device, $a f$ and $a e$, for feeding the heating device B A. (Shown in Fig. 1.) This device is for the purpose of causing the water or liquids to be evaporated from organic or inorganic matter to be circulated in two or more streams, or simultaneously in several of the conduits, until discharged into the separator $g^2$. The two feeding devices $a f$ and $a e$ are designed to connect and feed a heating device containing fifteen sections of conduits. The connecting device $a f$ is provided with holes $f u$, $f u'$, $f v$, $f v'$, $f w$, $f w'$, $f x$, $f x'$, $f y$, $f y'$, $f z$, $f z'$, $g a$, and $g a'$. To each one of these holes a right-and-left nipple is fitted, and which are also connected by right-and-left couplings to the ends of each one of the ends which project tangentially from the outer turns of the conduits, as shown in Figs. 1 and 22. The circulating device $a e$ is provided with holes $g i$, $g i'$, $g k$, $g k'$, $g l$, $g l'$, $g m$, and $g m'$, to each of which a right-and-left nipple is fitted and connected to the inner projecting ends, $f'$, which project tangentially from the inner turn of the conduit by right-and-left couplings $e$. This device $a e$ is fitted to but eight of the coils or conduits, the two upper and five lower ones being independent thereof. The two upper coils at their induction ends are fed by a double pump or by some other analogous device. The eduction therefrom is discharged into the circulating device $a f$ at $f u$ $f w'$, where the liquid is discharged into chambers $f p$ $f o$.

The liquid is discharged from thence through openings $fv\,fv'$ and $fw\,fw'$ into the connected conduits, wherein it now circulates in four streams, and discharges into and through corresponding openings, $gj$, $gj'$, $gk$, and $gk'$ into chambers $fs$ and $ft$, from whence the liquid is discharged therefrom through openings $gl$, $gl'$, $gm$, and $gm'$ into and through the corresponding conduits, from whence it is discharged through openings $fx\,fx'$ into chamber $fq$ and openings $fy\,fy'$ into chamber $fr$, from whence the liquid is forced through openings $fz$, $fz'$, $fz^2$, $ga$, and $ga'$ into the five lower conduits, from whence the liquid is discharged into the separator $g^2$.

$gh$, $gb$, $gi$, and $gn$ are apertures for filling and draining the chambers and coils. $gf$, $ge$, $gc$, $gh$, and $go$ are apertures at the bottom of the chambers $fo$, $fr$, $fs$, and $gh'$ for the purpose of draining the chambers and conduits.

The heating device B A (shown in Fig. 16) is a device consisting of a shell which incloses a conical coil, $fn$, the two ends of which are connected by couplings $e$ to a feed-pipe, $ad$, and to a stand-pipe or separator, $g^2$. Liquids are forced through the feed-pipe $ad$ into the coil or conduit $fn$, thence downward and out through pipe $f$ into stand-pipe $g^2$, where the steam is eliminated and escapes through pipe $d^2$, and is discharged into dome $b'$, from whence it is conducted away to places of use by pipes $b^2$, $g$, and $c'$. $au$ is a trap for conducting away the matter to be recovered. Evaporating-pans can be placed in connection with the apparatus, and the trap discharges the contents thereof into said pans, wherein the evaporation can be continued to any degree or consistency required when in the form of a sirup; but when complete dryness is required the pans shown in Figs. 2, 3, 4, and 5 should be employed. Two or more of the coils $fn$ can be located in the furnace $J^a$, and also, a superheating-coil can be provided, which can extend from the grate-bars $L^a$ to the bottom of the coil $fn$.

In Fig. 17 a vertical sectional view of a coil, $fn$, is shown, with an interior coil, $he$, coiled therein. One, two, or more of the central turns of this internal coil are perforated for the purpose of spraying liquids therefrom into the outer coil, $fn$. The liquids are forced into the internal coil by the pump $hd$, which is driven by steam conducted from dome $b'$ through pipe $g$, the steam being controlled by valve 55. The liquid can be forced into either the top or the bottom of the coil, or at top and bottom simultaneously, by means of valve 56 on pipe $ha$ and valve 57 on pipe $hb$. The steam within the outer coil, $fn$, escapes therefrom through the upper and lower ends or connecting-pipes, $hj\,hj'$, from whence it is discharged into the stand-pipe or separator $g^2$, from thence through pipe $d^2$ into dome $b'$, from which it is drawn or conducted to places of use. The condensation or liquid matter passes off through the trap $au$. One, two, or more of these coils can be located over the furnace $J^a$, and all connect with the separator $g^2$ and the pump $hd$, and also a superheating-coil can be located within the fire-box and rest upon the grate-bars $L^a$, as shown in Fig. 1.

Fig. 18 represents a vertical broken sectional view of an evaporator consisting of a conduit or coil of pipe, $fn$. This coil is provided with an internal coil, $he$. The pipes composing these coils are at first welded into suitable lengths, and then put together and coiled in the same operation. The two ends of the external coil, $hj\,hj'$, are made shorter than the internal pipe. To these ends a T, $ho$, and a cross, $hn$, are fitted, while the ends $hu\,hu'$ of the internal pipe or coil project through the said T $ho$ and cross $hn$ for the purpose of turning the bushings $hg$ and $hq'$ thereon and into the T and cross-fittings, and also to receive the T's $hp$ and $hp'$, thus forming a connection of the internal coil, $he$, with the steam stand-pipe $hk$ and $hk'$. The steam therein is conducted to a dome or other suitable place by pipe $hl$, while the condensation or drainage is effected through pipe $hm$, which is provided with a valve. (Not shown.) By closing valve 59 the steam can be made to pass out at the upper end, $hu$, of the coil $he$, while the condensation or the liquid and other matter can be drawn off through pipe $hm$. This pipe can be connected with a trap which will keep the coil from filling up with any substance. Liquids are forced through pipe $iy$ into T-fitting $ix$, where the stream divides and is forced up and down through pipes $ha\,hb$, from whence the liquid is discharged into T $ho$ and cross $hn$, and from thence it is forced into the space between the interior of the external pipe and the exterior of the internal pipe, which, when highly heated, causes a rapid expansion of the volatile parts of the liquid, which may be steam, vapor, or gas, the egress of which is through perforations $iz$ in the internal pipe, $he$, to the dome or place of use. The external coil, $fn$, is drained through pipe $hs$. This pipe is provided with a valve which is not shown in the drawings. The advantage derived from a steam-generator of the above description is that a maximum heating-surface is presented to a minimum amount of liquid or water. It will be seen that the space between the two pipes can be reduced to a thirty-second of an inch. Thus when filled with water steam will be evolved rapidly therefrom.

The view shown in Fig. 19 is a modification of the coil shown in Fig. 18. The internal coil, $he$, is formed from two separate pipes which do not meet within the external pipe, $fm$, as shown through the broken external coil. The steam which is generated within the external pipe enters the internal pipes at their open ends and is conducted away, as described in Fig. 18.

Figs. 20 and 21 represent a side elevation of the heating device B A and an evaporating-pan, $E^p$. This apparatus is designed to heat and evaporate liquids from the soluble matter contained therein, which is easily destroyed by heat. Any desirable number of the lower coils or conduits, $n$, are provided with an internal coil, $h\,e$. The liquid is at first forced into the upper coils, where the heat is not sufficient to destroy the soluble matter, and thence forced downward and out into proper connections, from whence it will be forced into the internal coil or conduit, and finally discharged therefrom into a separator in which the steam or vapor is eliminated from the mass, the steam or vapor being conducted from thence into a suitable dome, from whence it is conducted to and through the lower coils or conduits, $n$, where it becomes superheated and conducted into the evaporating pan or pans, or to other places of use. Only one evaporating-pan is shown in connection with the heating device, while two or more can be placed in connection therewith when desirable. The shell in the heating device B A is broken away for the purpose of showing the coils or conduits $n$, the lower ones of which are also broken, so as to show the internal coil or conduit, $h\,e$. The ends $a\,m$ of the outer turn of the upper coils are connected by right-and-left couplings $a\,i$, nipples, and return-bends $a\,n$. The lower ends of the outer coils are connected to T-fittings $i\,n$, while the ends of the internal coils project through said T's and connect with said stand-pipe $i\,l$. The T-fitting $i\,n$ is connected to a steam stand-pipe, $ij$, by nipples $i\,u$. (Shown in Fig. 22.) The ends $f'$, projecting from the inner turns of the upper coils, are connected by right-and-left couplings $e$ to return-bends $f\,a$, while the lower ends are connected to T-fittings $i\,o$. These T's are connected by nipples $i\,v$ to a steam stand-pipe $i\,k$. The ends $i\,w$ of the internal coil project through the T's $i\,o$, and are connected to the separator $g^2$, as shown in Fig. 22.

The evaporating-pan $E^p$, Fig. 22, is broken away to show the interior thereof. The pump $h\,d$ receives steam through pipe $g$, which is provided with controlling-valve 55. Water or liquid is conducted to the pump by pipe $i\,s$, with valve 67 thereon. The liquid is forced from the pump through eduction-pipe $o^7$ into the upper coil, or at first through the supporting-pipes $d\,k$, and from thence to and through the upper coil or conduit, from whence it is circulated downward through the series until it is discharged into stand-pipe $i\,l$. From thence it is forced through the internal coils, $h\,e$, and is finally discharged into the separator $g^2$, where the steam or volatile matter is eliminated from the solid or unvolatilized part, and is conducted by pipe $d^2$ into a dome or receiver, from whence it is conducted by pipe $b^2$, which is provided with controlling-valve 44, and discharged into the steam stand-pipe $i\,j$, from whence it is distributed and forced into and through the outer coil or conduit, $n$, and thence discharged therefrom into steam stand-pipe $i\,k$, from whence it is conducted through pipe H I, which is provided with controlling-valve 68, into the heating-coil $l'$, from whence it is discharged through ejector $z^2$. The matter in the separator $g^2$ which has not volatilized is conducted down through pipe $a\,p$, which is provided with valve 58, into trap $a\,u$, from whence it is discharged through conducting-pipes $h^2$ and $v^2$ into the spiro-convoluted evaporating-pan $E^p$, at or near the center thereof, thence through the spiral channel $b^3$, and finally discharged therefrom at the outlet F G. The steam stand-pipes $i\,j$ and $i\,k$ are drained by pipes $i\,r$ and $i\,q$, which are provided with controlling-valves 64 and 65. The feed-water stand-pipe $i\,l$ is drained by pipe $i\,m$, which is provided with valve 62. This heating and evaporating apparatus can be made either portable or stationary, and used for the purpose of evaporating liquids and recovering therefrom any organic matter contained therein.

The apparatus shown in Figs. 1 and 2 is designed to evaporate liquids from inorganic substances or matter. The heating device B A is similar to the one shown in succeeding figures, while the evaporating pan or chamber $R^a$ differs very materially from the spiral-channeled pan shown in Figs. 6, 7, 8, 9, and 10. This evaporating apparatus can be employed to evaporate saccharine juices and other liquids containing organic matter; but as the evaporation would have to be continued in bulk or in large quantities while in the chamber $R^a$, and subjected to long-continued heat, which has a tendency to injure the product, it is advisable to employ the spiral-channeled pan, whereby there is a constant circulation of the matter through said spiral until the proper degree of consistency or evaporation is obtained; but when inorganic matter—such as salts—is to be recovered the chamber $R^a$ is preferred, for the reason that if allowed to enter the spiral channel the deposition of solid matter would now clog the channel, and when once filled said channel would be difficult to clean, while in the chamber $R^a$ that operation would be comparatively easy.

In recovering inorganic matter from liquid solution containing sodium, alkalies, or other salts the liquid matter is forced into the upper coil or conduit, and thence downward through the series of conduits, whence it is finally discharged therefrom into the separator $g^2$, where steam, vapor, or gas is eliminated from the solid matter which is combined with a portion of the liquid which is not evolved to steam, vapor, or gas, and discharged into chamber $R^a$, where the remaining liquid is evolved to steam, vapor, or gas by the heat remaining therein while under pressure; and when said heat is not sufficient to eliminate the liquid matter the heat can be so increased by means of a fire in the furnace $Q^a$, which will generate steam in the water and steam jacket $T^a$ and $U^a$; or the steam may be derived from some other sources, one of which is shown in the drawings, which is to conduct steam from the dome, and which has been previously eliminated from the liquid matter while in the separator $g^2$ by means of suitable pipe-connection and discharge the same into the steam-space surrounding the chamber or chambers $R^a$.

Three of these chambers are shown in Fig. 4, where by the alternate action thereof a continued evaporation of liquid matter from and removal of the desiccated substance can be effected.

Petroleum can be forced into and through the heating device B A, and discharged from thence into the separator $g^2$, wherein the most volatile parts will pass off into the dome $b$, and be conducted from thence through pipe $d\ p$, and forced from thence, with or without a jet of steam, into the superheater $I^a$, wherein it will be converted to a fixed gas, and thence discharged therefrom into a pump, if needed, and from thence into suitable gas-holders for subsequent use. In the meantime the residue can be discharged into suitable holders, or a series of them, wherein the necessary volatilization can be completed.

In Fig. 3 the discharge ends of the lower conduits of the heating device B A connect with the evaporating-chamber, which is provided with a steam-tight cover, $A^b$. The steam, vapor, or gas which is eliminated therefrom is conducted to the dome, and from thence by pipe $d\ p$ to the superheater $I^a$, (shown in Fig. 1,) thence through said superheater, and is finally discharged into the pipe $f\ d$, which conducts said steam to the heating-coil $y\ a$, through which it circulates, and is finally discharged through pipe $f\ k$. This apparatus can be made portable and taken from place to place and do the work required in evaporating and recovering organic or inorganic matter from liquids.

The heating device B A can be made in any suitable form and dimension. The liquids to be evaporated can be forced in at any intermediate point between the upper and lower section or conduit. When any light or volatile liquids are to be evaporated the coils can be inclosed in a steam-tight jacket or chamber, which can be made to sustain any required pressure. Steam can be forced therein at any given pressure, the condensation of which can be tapped off as fast as it accumulates; or a blow-off pipe can be used for draining said chamber. The coils within the chamber can be connected with a suitable stand-pipe or chamber for the elimination of the volatile matter, while the residual or remaining portion will escape to an evaporating pan or pans; and, also, the said residual matter can be discharged from the stand-pipe into an open or covered chamber or chambers, as shown in Figs. 1, 2, and 4; or it can be discharged directly from the heating device into a chamber or chambers shown in Figs. 3 and 5. These chambers can be provided with spiral channels, as shown in the evaporating-pans shown in Figs. 6, 7, 8, 9, and 10.

A heating device consisting of external and internal conduits can be arranged in any suitable manner with or in an inclosing jacket thereto. The liquid to be heated can be forced through one of the conduits, while steam or heated gases or heated liquids can be forced through the other, whereby heat will be imparted to the liquid to be volatilized. When acid solutions are to be evaporated conduits made from suitable metals can be employed in like manner; or the conduits can be formed without the internal one and inclosed in a steam-tight chamber, and then heated by steam, as above described.

I hereby disclaim in the present application the following claim, which appears in an application for a patent for improvements in evaporating saccharine juices, filed by the within-named applicant August 15, 1881, serial No. 39,869, and bearing even date herewith, as follows:

"The process of concentrating liquids containing solid matter in solution, which consists in forcing and spraying them under pressure into and through a heated coil, and finally separating the steam from the concentrated liquid or solid portion outside the furnace, and collecting the former in a dome and the latter in a suitable receptacle."

What I claim, and desire to secure by Letters Patent, is—

1. An evaporating-pan constructed with a double convoluted spiral channel.

2. An evaporating-pan constructed with convoluted spiral channel cast in one piece.

3. A double spiro-convoluted evaporating-pan having double spiral convolutions, one of which is for the circulation of the substance to be evaporated and recovered, while the other convoluted channel forms a passage or conduit for the circulation of a heated substance therein.

4. A spiro-convoluted vacuum-pan having external and internal spiral channels and a bottom fitted to the bottom of the external spiral channel, thereby forming a closed channel through which heating substances circulate.

5. The combination of a spiro-convoluted evaporating-pan with a steam-generator attached to the bottom thereof, arranged over a furnace which supplies the heat for evaporating the substance which circulates through the spiro channel or channels.

6. In an evaporating apparatus, the combination of the heating devices consisting of conduits or coils through which the liquid to be evaporated is forced, a closed evaporating-chamber connected directly to the lower ends of the coils and to the steam-dome above, and a closed chamber below said evaporating-chamber, provided with a steam-coil for desiccating the matter to be recovered.

7. In an evaporating apparatus, the combination of the heating device consisting of conduits through which the liquids to be evaporated are forced, a separator connected thereto into which the heated liquid is discharged, and two or more alternating evaporating-pans connected directly by pipes having controlling-valves to the separator, whereby either pan can be used for evaporating while the other is being emptied and cleansed.

8. The combination of a heating device consisting of conduits through which liquids to be evaporated are forced, and a separator into which the heated liquids are discharged and the volatile parts eliminated therefrom, with an open evaporating-chamber provided with heating adjuncts, into which the residual matter in the separator is discharged, and wherein the matter to be recovered becomes desiccated.

9. The process of heating and evaporating liquids, which consists in forcing the liquids through an internal heated conduit, and thus highly heating the same, then discharging it into a separator, and then conducting the resulting steam through the external conduit.

10. In an apparatus for evaporating liquids, a heating device consisting of a conduit or series of conduits, one or more of which are provided with an internal imperforate conduit through which liquid is forced, while steam simultaneously therewith is forced through the external conduit for the purpose of heating said liquid, in combination with the connecting stand-pipes, which are connected respectively to the ends of the internal and external conduits for receiving the liquids and steam separately, and from whence the conduits are supplied, and into which the contents of the conduits are discharged separately, as described.

11. The process of heating and evaporating liquids, which consists in forcing the liquids through an internal heating-conduit, and thus highly heating the same, then discharging it into a separator, then conducting the resulting steam through the external conduit exposed to the heat of the furnace, and finally utilizing the steam thus superheated by conducting it through the heating-conduits of an evaporating-pan for continuing the evaporation of the liquid discharged from the internal coils into the separator, as described.

12. In a device for heating liquids prior to the discharge and subsequent elimination of vapor therefrom, two connecting stand-pipes, one of which connects with all of the corresponding ends of one series of conduits which are placed one above another, while the other stand-pipe connects with a required number of the other ends of said conduits, whereby liquids are forced simultaneously and separately through two or more conduits and discharged therefrom from two or more of the lower ends of said series of conduits.

13. In an apparatus for heating and evaporating liquids, a conduit or supply-pipe, a stand-pipe, a series of internal coils connected therewith at their induction ends, and a separator connected with their eduction ends, in combination with connected external coils.

14. In an apparatus for heating and evaporating liquids, a conduit or supply-pipe, a stand-pipe, a series of internal coils connected therewith at their induction ends, and a separator connected with their eduction ends, in combination with connected external coils and an evaporating-pan, and connecting devices for conducting steam from the external coils to the pan.

15. The process of heating and evaporating liquids, which consists in forcing the liquid between an external and internal coil of pipe in a furnace to near the middle portion of the coil, thence discharging the resulting steam or vapor through suitable openings into the internal pipe and conducting it therefrom to places of use, and at the same time conducting the concentrated liquid to a suitable receptacle.

16. In combination with a conduit or conduits provided with an internal spray-conduit extending the entire length thereof, and through which liquids are forced, the device for forcing liquids into said internal conduit, from whence it is forced out in spray into the external conduit, and the separator by which the vapor and liquid are divided, in the manner set forth.

WM. FRANK BROWNE.

Witnesses:
R. SYLVANI,
JAMES M. TULLY.